United States Patent
Yoo et al.

(10) Patent No.: US 10,397,721 B2
(45) Date of Patent: Aug. 27, 2019

(54) APPARATUS AND METHOD FOR FRONTAL AUDIO RENDERING IN INTERACTION WITH SCREEN SIZE

(71) Applicants: Electronics and Telecommunications Research Institute, Daejeon (KR); Kyonggi University Industry & Academia Cooperation Foundation, Suwon-si (KR)

(72) Inventors: Jae Hyoun Yoo, Daejeon (KR); Seok Jin Lee, Seoul (KR)

(73) Assignees: Electrons and Telecommunications Research Institute, Daejeon (KR); Kyonggi University Industry & Academia Cooperation Foundation, Suwon-si (KR)

( * ) Notice: Subject to any disclaimer, the term of this patent is extended or adjusted under 35 U.S.C. 154(b) by 0 days.

(21) Appl. No.: 15/244,140

(22) Filed: Aug. 23, 2016

(65) Prior Publication Data

US 2017/0245088 A1    Aug. 24, 2017

(30) Foreign Application Priority Data

Feb. 24, 2016    (KR) .................. 10-2016-0021988

(51) Int. Cl.
*H04S 7/00*    (2006.01)
*H04N 5/60*    (2006.01)

(52) U.S. Cl.
CPC ............. *H04S 7/302* (2013.01); *H04N 5/607* (2013.01); *H04S 7/305* (2013.01); *H04S 2420/01* (2013.01); *H04S 2420/03* (2013.01)

(58) Field of Classification Search
CPC ...... H04S 7/302; H04S 7/305; H04S 2420/01; H04N 5/607
USPC ......................................................... 381/306
See application file for complete search history.

(56) References Cited

U.S. PATENT DOCUMENTS

| | | | |
|---|---|---|---|
| 5,910,990 A | 6/1999 | Jang | |
| 2007/0019831 A1 | 1/2007 | Usui | |
| 2010/0328419 A1* | 12/2010 | Etter | H04N 5/607 348/14.08 |
| 2011/0316966 A1* | 12/2011 | Lee | H04N 7/142 348/14.16 |
| 2012/0070021 A1 | 3/2012 | Yoo et al. | |
| 2013/0236039 A1 | 9/2013 | Jax et al. | |
| 2016/0104495 A1* | 4/2016 | Peters | G10L 19/008 381/22 |

* cited by examiner

*Primary Examiner* — Ahmad F. Matar
*Assistant Examiner* — Sabrina Diaz
(74) *Attorney, Agent, or Firm* — NSIP Law

(57) ABSTRACT

Provided is an apparatus and method for frontal audio rendering in interaction with a screen size, the method including measuring playback environment information used to play back input content; and correcting an audio signal to be output based on the measured playback environment information and production environment information included in the input content.

4 Claims, 4 Drawing Sheets

APPARATUS AND METHOD FOR FRONTAL AUDIO RENDERING IN INTERACTION WITH SCREEN SIZE

CROSS-REFERENCE TO RELATED APPLICATION(S)

This application claims the priority benefit of Korean Patent Application No. 10-2016-0021988 filed on Feb. 24, 2016, in the Korean Intellectual Property Office, the disclosure of which is incorporated herein by reference for all purposes.

BACKGROUND

1. Field

One or more example embodiments relate to an apparatus and method for frontal audio rendering in interaction with a screen size, and more particularly, to an apparatus and method for converting an audio signal in interaction with a screen size based on production environment information used to produce content and playback environment information used to play back the content.

2. Description of Related Art

With the continuing developments of researches on a next generation content playback environment, such as a three-dimensional television (3DTV), a 3D cinema, a ultra high definition TV (UHDTV), etc., an audio has also made a fast evolution to a sound playback environment using a multi-channel loudspeaker as an audio. In addition, there is a great difference between a broadcasting content production environment and a broadcasting content playback environment. In particular, with the digitalization of a broadcasting environment, various sizes of TVs, smart devices, etc., have been distributed. Accordingly, sound contents have been advanced to an ultra multichannel environment, such as 10.2 channel, 22.2 channel, 30.2 channel, etc., beyond 5.1 channel. An audio content production environment may use a further large display device to produce a multichannel audio that is synchronized with an image projected on a large screen. Here, in the case of a 22.2-channel system of NHK, a content production is performed based on a display device with the size of 400 to 600 inches.

Since the content is produced based on a large screen, the content may be reproduced in a different manner based on a sound effect, such as a variance in a sound image and the like. Accordingly, there is a desire for a method for audio rendering in interaction with screen size information of a playback environment based on content production information.

SUMMARY

One or more example embodiments provide an apparatus and method for converting an audio signal in interaction with a screen size of a playback environment based on production environment information used to produce content and playback environment information used to play back the content.

According to an aspect of one or more example embodiments, there is provided a method for content production in interaction with a screen size, the method including providing a speaker on left edge or right edge of a screen for producing content; and producing the content to match an audio signal provided through the speaker with an image played back on the screen. The producing includes creating production environment information used to produce the content to be in a form of metadata.

The production environment information may include information about a size of the screen and information about a distance between the screen and a content producer.

According to an aspect of one or more example embodiments, there is provided an apparatus for content production in interaction with a screen size, the apparatus including an arrangement device configured to providing a speaker on left edge or right edge of a screen for producing content; and producing the content to match an audio signal provided through the speaker with an image played back on the screen. The production device is further configured to create production environment information used to produce the content as metadata.

The production environment information may include information about a size of the screen and information about a distance between the screen and a content producer.

According to an aspect of one or more example embodiments, there is provided a method for frontal audio rendering in interaction with a screen size, the method including measuring playback environment information used to play back input content; and correcting an audio signal to be output based on the measured playback environment information and production environment information included in the input content.

The playback environment information may include information about a size of a screen for playing back the input content and information about a distance between the screen and a user.

The correcting may include calculating a first angle between a producer and a speaker provided when the input content is produced, based on the production environment information; calculating a second angle between the user and a speaker provided on left edge or right edge of a screen for playing back the input content based on the playback environment information; measuring a third angle between the user and an actually provided speaker based on the playback environment information; and correcting the audio signal to be output based on the first angle, the second angle, and the third angle.

The correcting may include applying a head-related transfer function (HRTF) to the first angle, the second angle, and the third angle.

According to an aspect of one or more example embodiments, there is provided an apparatus for frontal audio rendering in interaction with a screen size, the apparatus including a measurer configured to measure playback environment information used to play back input content; and a corrector configured to correct an audio signal to be output based on the measured playback environment information and production environment information included in the input content.

The playback environment information may include information about a size of a screen for playing back the input content and information about a distance between the screen and a user.

The corrector may be further configured to calculate a first angle between a producer and a speaker provided when the input content is produced, based on the production environment information, calculate a second angle between the user and a speaker provided on left edge or right edge of a screen for playing back the input content based on the playback environment information, measure a third angle between the user and an actually provided speaker based on the playback environment information, and correct the audio signal to be output based on the first angle, the second angle, and the third angle.

The corrector may be further configured to apply an HRTF to the first angle, the second angle, and the third angle.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
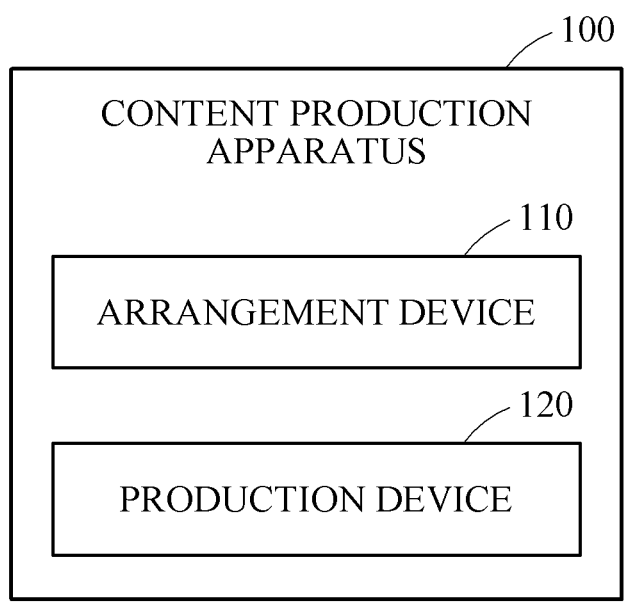
FIG. 1 is a block diagram illustrating a content production apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The example embodiments will be described with reference to the accompanying drawings. However, the present disclosure is not limited thereto or restricted thereby. Like reference numerals in the drawings refer to like elements throughout.

FIG. 1 is a block diagram illustrating a content production apparatus according to an example embodiment.

Referring to FIG. 1, a content production apparatus 100 may include an arrangement device 110 and a production device 110. The arrangement device 110 may provide a speaker on left edge or right edge of a screen for producing content.

The production device 120 may produce the content to match an audio signal provided through the speaker with an image played back on the screen. The production device 120 may create production environment information used to produce the content to be in a form of metadata. Here, the production environment information created as metadata at the production device 120 may include information about a size of the screen for producing the content and information about a distance between the screen and a content producer.

Figure 2:
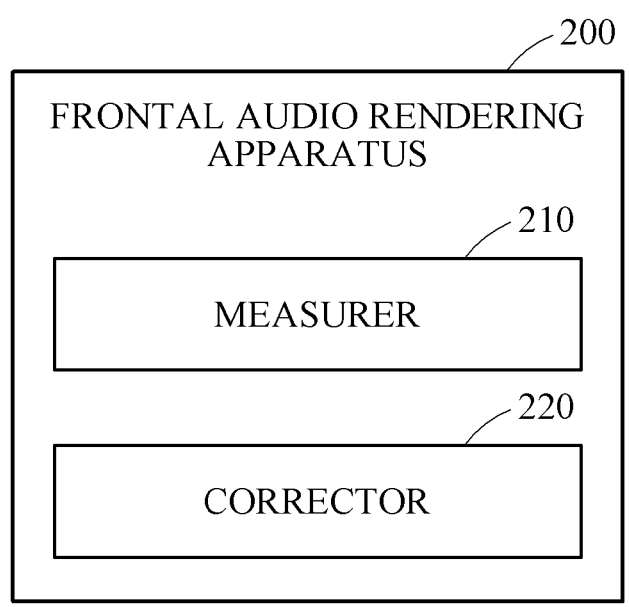
FIG. 2 is a block diagram illustrating a frontal audio rendering apparatus according to an example embodiment.

FIG. 2 is a block diagram illustrating a frontal audio rendering apparatus according to an example embodiment.

Referring to FIG. 2, a frontal audio rendering apparatus 200 may include a measurer 210 and a corrector 220. The measurer 210 may measure playback environment information about an environment in which input content is to be played back. Here, the measured playback environment information may include information about a size of a screen for playing back the input content and information about a distance between the screen and a user, such as audience and the like.

The corrector 220 may correct an audio signal to be output based on the measured playback environment information and production environment information included in the metadata of the input content. Although not illustrated, a general playback apparatus for playing back content does not include speakers at both ends of a screen for playing back content and thus, a location of an object and a location of a sound image corresponding thereto may be differently represented on the screen. Accordingly, the corrector 220 may need to appropriately convert an audio signal of the corresponding content based on production environment information used to produce the content and playback environment information used to play back the content.

In detail, the corrector 220 may calculate a first angle between a producer and a speaker provided when the input content is produced, based on the production environment information included in the metadata of the input content. The corrector 220 may calculate a second angle between the user and a speaker provided on left edge or right edge of a screen for playing back the input content based on the playback environment information measured at the measurer 210. The corrector 220 may measure a third angle between the user and an actually provided speaker based on the playback environment information.

Here, the corrector 220 may correct the audio signal to be output to represent the effect of transferring the audio signal to both ends of the screen included in the playback apparatus (not shown) by applying a head-related transfer function (HRTF) to the first angle, the second angle, and the third angle.

Figure 3:
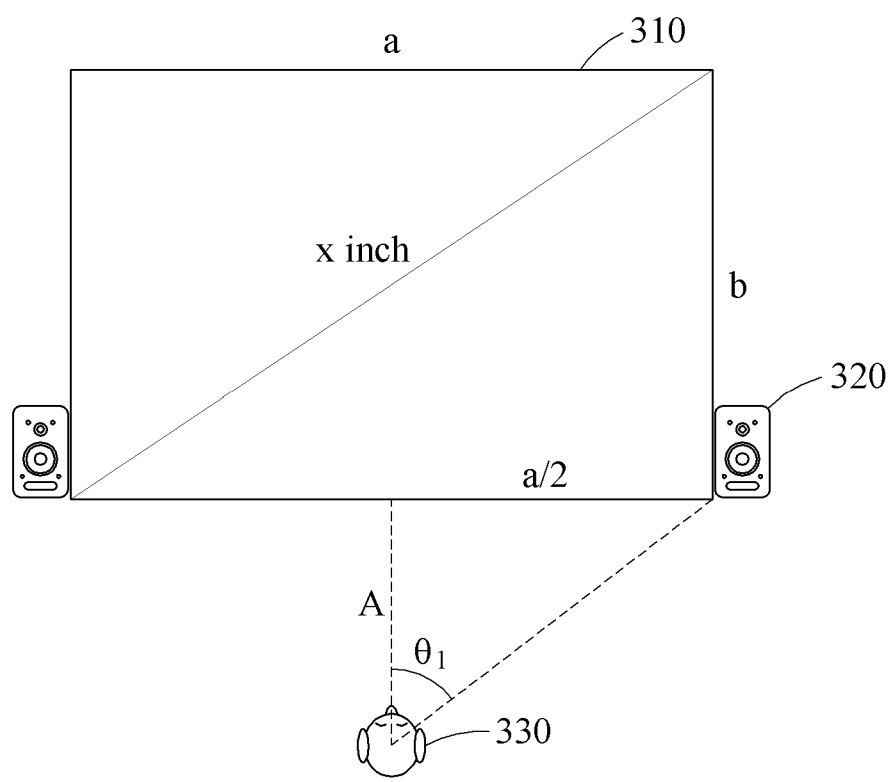
FIG. 3 illustrates an example of information about a content production environment according to an example embodiment.

FIG. 3 illustrates an example of information about a content production environment according to an example embodiment.

According to an example embodiment, the frontal audio rendering apparatus 200 may require production environment information used to produce content, in order to output an audio signal in interaction with a size of a screen included in a playback apparatus.

Referring to FIG. 3, it is assumed that a producer 330 controls sound information at a location separate by distance A from a screen 310 with a size of x inches. In this example, the frontal audio rendering apparatus 200 may acquire an angle of a speaker 320 provided ahead.

Here, the angle of the speaker 320 provided ahead may refer to an angle $\theta_1$ between the producer 330 and the speaker 320.

For example, the screen 310 may have a screen ratio of 16:9. In this example, if a horizontal axis length of the screen 310 is a and a vertical axis length of the screen 310 is b, the following relationship may be established as expressed by Equation 1.

$$a^2+b^2=x^2 \qquad \text{[Equation 1]}$$

Equation 2 may be acquired by arranging Equation 1 with respect to the vertical axis length b.

$$b = \frac{9}{16}a \qquad \text{[Equation 2]}$$

Equation 3 may be acquired by substituting Equation 1 with Equation 2.

$$a^2 + \left(\frac{9}{16}a\right)^2 = x^2 \qquad \text{[Equation 3]}$$

$$\left(1 + \left(\frac{9}{16}\right)^2\right)a^2 = x^2$$

$$\therefore a = \sqrt{\frac{x^2}{1 + \left(\frac{9}{16}\right)^2}}$$

The angle $\theta_1$ between the producer 330 and the speaker 320 in a content production environment may be acquired according to Equation 4.

$$\tan\theta_1 = \frac{\frac{a}{2}}{A} = \frac{a}{2A} \qquad \text{[Equation 4]}$$

$$\therefore \theta_1 = \tan^{-1}\left(\frac{a}{2A}\right) = \tan^{-1}\left(\frac{\sqrt{\frac{x^2}{1+\left(\frac{9}{16}\right)^2}}}{2A}\right)$$

To acquire information about the angle $\theta_1$ of the speaker 320 provided ahead in the content production environment, information about a size of the screen 310 and information about a distance between the screen 310 and the producer 330 may be required. Here, information about the size of the screen 310 and information about the distance between the screen 310 and the producer 330 may be provided in a form of metadata. The frontal audio rendering apparatus 200 may calculate the angle $\theta_1$ of the speaker 320 that is provided ahead in the content production environment based on the metadata.

Figure 4:
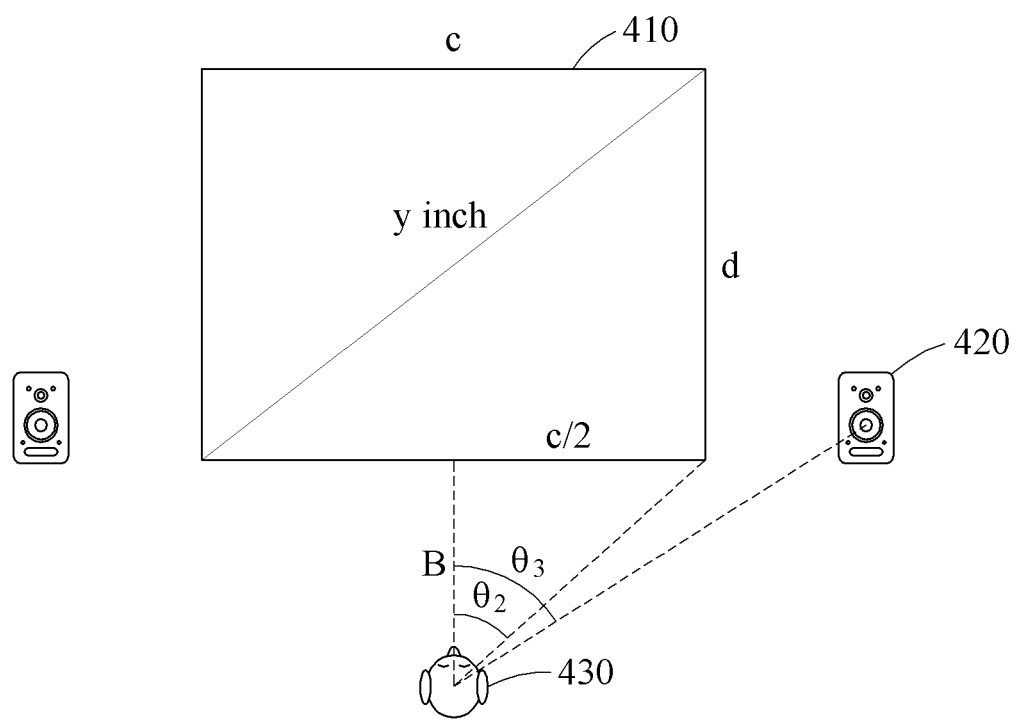
FIG. 4 illustrates an example of information about a content playback environment according to an example embodiment.

FIG. 4 illustrates an example of information about a content playback environment according to an example embodiment.

Content that includes production environment information in a form of metadata may be played back in a playback environment in which various sizes of screens are present. Here, the frontal audio rendering apparatus 200 may need to convert an audio signal in interaction with a size of a screen included in the playback apparatus based on the metadata included in the content.

Referring to FIG. 4, it is assumed that a user 430, such as a viewer and the like, views content at a location separate by distance B from a screen 410 with a size of y inches. In this example, the frontal audio rendering apparatus 200 may acquire an angle of a speaker 420 provided ahead as follows. Here, the angle of the speaker 420 provided ahead may refer to an angle $\theta_2$ between the user 430 and the speaker 420.

For example, the screen 410, for example, a TV screen, may have a screen ratio of 4:3. In this example, if a horizontal axis length of the screen 410 is c and a vertical axis length of the screen 410 is d, the following relationship may be established as expressed by Equation 5.

$$\therefore c = \sqrt{\frac{y^2}{1 + \left(\frac{3}{4}\right)^2}} \qquad \text{[Equation 5]}$$

The angle $\theta_2$ between the user 430 and the speaker 420 in a content playback environment may be acquired according to Equation 6.

$$\therefore \theta_2 = \tan^{-1}\left(\frac{c}{2B}\right) = \tan^{-1}\left(\frac{\sqrt{\frac{y^2}{1+\left(\frac{3}{4}\right)^2}}}{2B}\right) \qquad \text{[Equation 6]}$$

To acquire information about the angle $\theta_2$ of the speaker 420 provided ahead in the content playback environment, information about a size of the screen 410 and information about a distance between the screen 410 and the user 430 may be required.

Here, as described above, although not illustrated, the general playback apparatus for playing back content does not include speakers at both ends of a screen for playback content and thus, a location of an object and a location of a sound image corresponding to thereto may be differently represented on the screen.

That is, in the content playback environment, the angle $\theta_2$ of the speaker 420 provided ahead and an angle $\theta_3$ of the speaker substantially provided ahead may differ from each other. Thus, an image on the screen and an actual sound image may not match.

To solve the aforementioned issues, the frontal audio rendering apparatus 200 may appropriately correct an audio signal to be output in interaction with a size of the screen included in the playback apparatus using a an HRTF.

To this end, if angle data of the HRTF is not accurately mapped to a corresponding angle, the frontal audio rendering apparatus 200 may use the angle data of the HRTF corresponding to a most proximate angle.

For example, if signal denotes a received signal and signal' denotes a corrected signal, the frontal audio rendering apparatus 200 may correct the audio signal according to Equation 7.

$$\text{signal}' = \text{signal} \times \frac{HRTF \text{ of } \theta_2}{HTRF \text{ of } \theta_3} \qquad \text{[Equation 7]}$$

The corrected signal signal' may represent the effect as if an audio environment transferred from an actual speaker to the user 430 is offset and the audio signal is transferred from both ends of the screen 410. That is, although the actual speakers are not located at both ends of the screen 410, the frontal audio rendering apparatus 200 may provide the audio signal as if the actual speakers are located at both ends of the screen 410 using the corrected signal. Equation 8 may be acquired by applying the angle $\theta_2$ between the user 430 and the speaker 420 provided ahead to Equation 7.

$$\text{signal}' = \text{signal} \times \frac{HRTF\left(\tan^{-1}\left(\frac{\sqrt{1+\left(\frac{3}{4}\right)^2}}{2B}\right)\right)}{HRTF(\theta_3)} \qquad \text{[Equation 8]}$$

If the screen ratio of the screen 410 is generalized without being limited to 4:3, a conversion equation may be acquired as expressed by Equation 9.

$$\text{signal}' = \qquad \text{[Equation 9]}$$

$$\text{signal} \times \frac{HRTF\left(\tan^{-1}\left(\frac{\sqrt{1+\left(\frac{\text{aspect ratio}}{\text{of reproduction}}\right)^2}}{2B}\right)\right)}{HRTF(\theta_3)}$$

Using Equation 9, the frontal audio rendering apparatus 200 may create an audio signal in interaction with the screen 410 included in the playback apparatus.

Hereinafter, a first example embodiment will be described.

If the angle $\theta_1$ is equal to the angle $\theta_3$ as in a case in which the playback apparatus is appropriately configured based on a standard, the frontal audio rendering apparatus 200 may correct an audio signal as follows. That is, the frontal audio rendering apparatus 200 may correct an audio signal by offsetting an audio signal present at a location corresponding to the angle $\theta_1$ and by newly adding an audio signal present at a location corresponding to the angle $\theta_2$. It may be expressed by Equation 10.

$$\text{signal}' = \text{signal} \times \frac{HRTF \text{ of } \theta_2}{HRTF \text{ of } \theta_1} \qquad \text{[Equation 10]}$$

Equation 11 may be acquired by applying Equation 10 to the angles $\theta_1$ and $\theta_2$.

$$\text{signal}' = \text{signal} \times \frac{HRTF\left(\tan^{-1}\left(\frac{\sqrt{1+\left(\frac{3}{4}\right)^2}}{2B}\right)\right)}{HRTF\left(\tan^{-1}\left(\frac{\sqrt{1+\left(\frac{9}{16}\right)^2}}{2A}\right)\right)} \qquad \text{[Equation 11]}$$

If a screen ratio of the screen 310 in a production environment and a screen ratio of the screen 410 in a playback environment are generalized, a conversion equation may be acquired as expressed by Equation 12.

$$\text{signal}' = \qquad \text{[Equation 12]}$$

$$\text{signal} \times \frac{HRTF\left(\tan^{-1}\left(\frac{\sqrt{1+\left(\frac{\text{aspect ratio}}{\text{of reproduction}}\right)^2}}{2B}\right)\right)}{HRTF\left(\tan^{-1}\left(\frac{\sqrt{1+\left(\frac{\text{aspect ratio}}{\text{of authoring}}\right)^2}}{2A}\right)\right)}$$

That is, using information about the size of the screen 310 in the production environment and the size of the screen 410 in the playback environment and information about the distance between the screen 310 and the producer 320 and the distance between the screen 410 and the user 430, the frontal audio rendering apparatus 200 may prevent an error occurring in sound playback due to a difference between the production environment and the playback environment.

Hereinafter, a second example embodiment will be described.

If the angle $\theta_2$ is equal to the angle $\theta_3$ by disposing the speakers 420 at both ends of the screen 410 in the playback environment, the frontal audio rendering apparatus 200 may offset an audio signal in the playback environment and may produce an audio signal optimized for the production environment. It may be represented by Equation 13.

$$\therefore \text{signal}' = \text{signal} \times \frac{HRTF \text{ of } \theta_1}{HRTF \text{ of } \theta_2} = \qquad \text{[Equation 13]}$$

$$\text{signal} \times \frac{HRTF\left(\tan^{-1}\left(\frac{\sqrt{1+\left(\frac{9}{16}\right)^2}}{2A}\right)\right)}{HRTF\left(\tan^{-1}\left(\frac{\sqrt{1+\left(\frac{3}{4}\right)^2}}{2B}\right)\right)} =$$

$$\text{signal} \times \frac{HRTF\left(\tan^{-1}\left(\frac{\sqrt{1+\left(\frac{\text{aspect ratio}}{\text{of authoring}}\right)^2}\cdot x^2}{2A}\right)\right)}{HRTF\left(\tan^{-1}\left(\frac{\sqrt{1+\left(\frac{\text{aspect ratio}}{\text{of reproduction}}\right)^2}\cdot y}{2B}\right)\right)}$$

According to example embodiments, it is possible to convert an audio signal in interaction with a screen size of a playback environment based on production environment information used to produce content and playback environment information used to play back the content.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for audio rendering, the method comprising:
    identifying an audio signal of content generated based on a production environment in which first speakers are located at a left edge and a right edge of a first screen;
    converting the audio signal based on a playback environment, when second speakers are not located at a left edge and a right edge of a second screen for playback of the content; and
    rendering the converted audio signal,
    wherein the audio signal is converted based on a location of the second speakers with respect to the second screen and a horizontal axis length of the second screen, in the playback environment, and
    wherein when information of the production environment is different from information of the playback environment, the audio signal is rendered based on a first angle between a producer and one of the first speakers that is provided when the content is produced, a second angle between a user and a speaker position on the left edge or the right edge, and a third angle between the user and one of the second speakers that is in the playback environment.

2. The method of claim 1, wherein the audio signal is rendered based on a size of the second screen and a distance between the second screen and the user.

3. An apparatus for audio rendering, the apparatus comprising: one or more processors configured to
    identify an audio signal of content generated based on a production environment in which first speakers are located at a left edge and a right edge of a first screen,
    convert the audio signal based on a playback environment, when second speakers are not located at a left edge and a right edge of a second screen for playback of the content, and
    render the converted audio signal,
    wherein the audio signal is converted based on a location of the second speakers with respect to the second screen and a horizontal axis length of the second screen, and
    wherein when information of the production environment is different from information of the playback environment, the audio signal is rendered based on a first angle between a producer and one of the first speakers that is provided when the content is produced, a second angle between a user and a speaker position on the left edge or the right edge, and a third angle between the user and one of the second speakers that is in the playback environment.

4. The method of claim 1, wherein the audio signal is rendered based on a size of the second screen and a distance between the second screen and the user.

\* \* \* \* \*